(12) United States Patent
Kim et al.

(10) Patent No.: US 11,486,822 B2
(45) Date of Patent: Nov. 1, 2022

(54) SPECIMEN INSPECTION DEVICE AND SPECIMEN INSPECTION METHOD

(71) Applicant: INDUSTRY-UNIVERSITY COOPERATION FOUNDATION HANYANG UNIVERSITY, Seoul (KR)

(72) Inventors: Hak Sung Kim, Seoul (KR); Gyung Hwan Oh, Seoul (KR); Dong Woon Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 17/263,742

(22) PCT Filed: Jul. 24, 2019

(86) PCT No.: PCT/KR2019/009206
§ 371 (c)(1),
(2) Date: Jan. 27, 2021

(87) PCT Pub. No.: WO2020/022786
PCT Pub. Date: Jan. 30, 2020

(65) Prior Publication Data
US 2021/0310943 A1    Oct. 7, 2021

(30) Foreign Application Priority Data

Jul. 27, 2018  (KR) .................. 10-2018-0087942

(51) Int. Cl.
*G01N 21/3581*   (2014.01)
*G01N 21/88*    (2006.01)

(52) U.S. Cl.
CPC ..... *G01N 21/3581* (2013.01); *G01N 21/8851* (2013.01); *G01N 2201/10* (2013.01)

(58) Field of Classification Search
CPC ........... G01N 21/3581; G01N 21/8851; G01N 2201/10
See application file for complete search history.

(56) References Cited

U.S. PATENT DOCUMENTS 5,963,662 A    10/1999  Vachtsevanos et al.
6,777,684 B1 *  8/2004  Volkov ............... G01N 21/3581
                                                                                        250/341.1
(Continued)

FOREIGN PATENT DOCUMENTS

JP    2006-300612 A      11/2006
JP    2006300612 A   *  11/2006
(Continued)

OTHER PUBLICATIONS

International Search Report of PCT/KR2019/009206 dated Nov. 20, 2019 [PCT/ISA/210].
(Continued)

*Primary Examiner* — David P Porta
*Assistant Examiner* — Fani Polyzos Boosalis
(74) *Attorney, Agent, or Firm* — Sughrue Mion, PLLC

(57) ABSTRACT

According to one embodiment of the present invention, A sample inspection device may provided, a total inspection module scanning a first area comprising a plurality of samples; a precision inspection module performing inspection on a sample determined as a suspected defective sample by the total inspection module in the first area; and a controller processing each data obtained from the total inspection module and the precision inspection module, and detecting a defective sample in the first area, wherein the precision inspection module may include an emitter emitting (Continued)

terahertz wave to the first area, a guide wire guiding an irradiation direction of the terahertz wave, and a vibration unit vibrating the guide wire.

15 Claims, 15 Drawing Sheets

(56) References Cited

U.S. PATENT DOCUMENTS

| | | |
|---|---|---|
| 2007/0215810 A1 | 9/2007 | Kurosaka et al. |
| 2008/0023633 A1 | 1/2008 | Mittleman et al. |
| 2015/0028210 A1 | 1/2015 | Han et al. |
| 2015/0051496 A1 | 2/2015 | Ouchi |

FOREIGN PATENT DOCUMENTS

| | | | | |
|---|---|---|---|---|
| KR | 10-2004-0060019 A | | 7/2004 | |
| KR | 10-2014-0098482 A | | 8/2014 | |
| KR | 20140098482 A | * | 8/2014 | ......... G01N 21/3586 |
| KR | 101460807 B1 | * | 11/2014 | ............. C07C 29/60 |
| KR | 101466807 B1 | | 11/2014 | |
| KR | 10-2015-0004146 A | | 1/2015 | |

OTHER PUBLICATIONS

Written Opinion of PCT/KR2019/009206 dated Nov. 20, 2019 [PCT/ISA/237].
Extended European Search Report dated Mar. 22, 2022 in European Application No. 19841700.8.
Communication dated Nov. 22, 2019 from the Korean Patent Office in Korean Application No. 10-2018-0087942.
Communication dated Mar. 9, 2020 from the Korean Patent Office in Korean Application No. 10-2018-0087942.

\* cited by examiner (a)　　　　　　　　(b)

SPECIMEN INSPECTION DEVICE AND SPECIMEN INSPECTION METHOD

CROSS REFERENCE TO RELATED APPLICATIONS

This application is a National Stage of International Application No. PCT/KR2019/009206, filed Jul. 24, 2019, claiming priority to Korean Patent Application No. 10-2018-0087942, filed Jul. 27, 2018.

The present invention relates to a sample inspection device using a terahertz wave.

The present invention relates to a sample inspection method using a terahertz wave.

BACKGROUND ART

Since the development of cutting-edge industries such as semiconductor industries, high-density and miniaturization technologies is currently in the spotlight, the development of non-destructive inspection technologies is also required.

A terahertz wave has properties of high permeability in nonconductive materials other than metals and of being harmless to the human body due to lower energy thereof than an X-ray. According to the properties of the terahertz wave, the terahertz wave can be applied to nondestructive inspection technologies.

Although studies for projection technologies using the terahertz wave are currently being conducted actively, the current developed technologies have limitations in being applied to the practical industries in resolution and imaging speed.

Technical Problem

The present invention is directed to providing a sample inspection device and a sample inspection method using a terahertz wave.

The present invention is directed to providing a sample inspection device and a sample inspection method using a total inspection module and a precision inspection module using a terahertz wave.

The present invention is directed to providing a sample inspection device and a sample inspection method in which a total inspection module detects suspected defective samples and a precision inspection module detects defective samples among the suspected defective samples.

Objectives to be solved by the present invention are not limited the above-described objectives, and objectives which are not described above will be clearly understood by those skilled in the art through the present specification and the accompanying drawings.

Technical Solution

One embodiment of the present invention provides a sample inspection device comprising a total inspection module, a precision inspection module, and a controller. The total inspection module may scan a first area comprising a plurality of samples. The precision inspection module may perform inspection on a sample determined as a suspected defective sample by the total inspection module in the first area. The controller may process each data obtained from the total inspection module and the precision inspection module, and detect a defective sample in the first area. The precision inspection module may comprise an emitter emitting a terahertz wave to the first area, a guide wire guiding an irradiation direction of the terahertz wave, and a vibration unit vibrating the guide wire.

Another embodiment of the present invention provides a sample inspection method comprising a total inspection step, a precision inspection step, and a control step. In the total inspection step, a first area comprising a plurality of samples may be scanned. In the precision inspection step, inspection may be performed on a sample determined as a suspected defective sample by the total inspection module in the first area. In the control step, each data obtained from the total inspection step and the precision inspection step may be processed, and a defective sample in the first area may be determined. The precision inspection step may comprise an emission step of terahertz wave to the first area, an irradiation direction guidance step of terahertz wave by a guide wire, and a vibration step of the guide wire by a vibration unit. Still another embodiment of the present invention provides a storage medium storing a sample inspection program for determine whether the plurality of samples are defective according to the sample inspection method.

Solutions for the objectives of the present invention are not limited to the above-described solutions, and solutions which are not described above will be clearly understood by those skilled in the art through the present specification and the accompanying drawings.

Advantageous Effects

In a sample inspection device and a sample inspection method according to embodiments, since a total inspection module performs total inspection on a plurality of samples included in a first area and a precision inspection module performs precision inspection on suspected defective samples determined by the total inspection module, there are effects in that fast inspection can be performed by the total inspection module on a wide area at high speed, and high resolution inspection can be performed by the precision inspection module on some of the area.

In the sample inspection device and the sample inspection method according to the embodiments, the total inspection module can scan a first area at high speed and a controller can collect coordinates of the suspected defective samples determined by the total inspection module and set a movement path of the precision inspection module on the basis of the collected coordinates of the suspected defective samples, and thus there is an effect in that an inspection time of the precision inspection module can be decreased.

Accordingly, in the sample inspection device and the sample inspection method according to the embodiments, inspection for the plurality of samples can be performed in a non-contact and non-destructive manner.

Effects of the present invention are not limited to the above-described effects, and effects which are not described above will be clearly understood by those skilled in the art through the following specification and the accompanying drawings.

MODES FOR INVENTION

Figure 1:
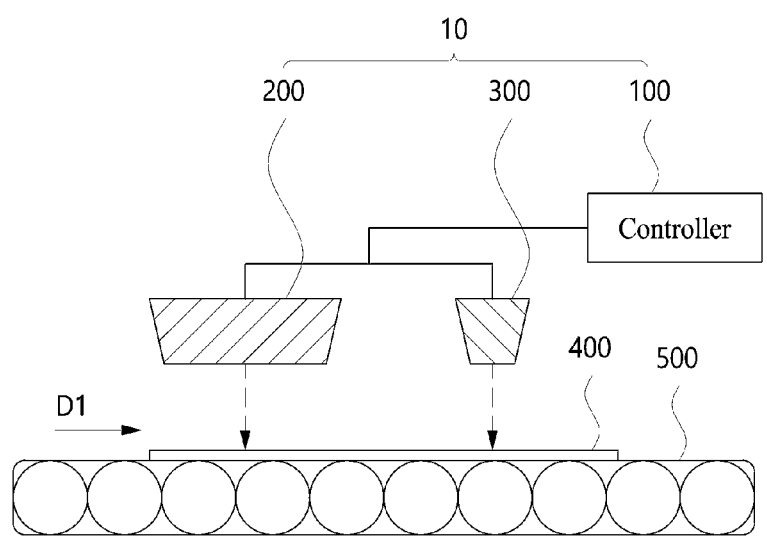
FIG. 1 is a view illustrating a sample inspection system and a sample inspection device according to one embodiment.

Hereinafter, specific embodiments of the present invention will be described in detail with reference to accompanying drawings. However, the scope of the present invention is not limited to the suggested embodiments, and other embodiments which are included in retrograde inventions or in the scope of the present invention may be easily suggested by those skilled in the art by adding, modifying, and deleting other components in the same scope of the present invention, and this may also be within the scope of the present invention.

In addition, components which are illustrated in drawings for embodiments and have the same function in the same scope are assigned to and described with the same reference numerals.

According to one embodiment of the present invention, a sample inspection device may be provided, and the sample inspection device comprises a total inspection module scanning a first area including a plurality of samples; a precision inspection module performing inspection on a sample determined as a suspected defective sample by the total inspection module in the first area, and a controller processing each data obtained from the total inspection module and the precision inspection module, and detecting defective samples in the first area, wherein the precision inspection module may comprise an emitter emitting a terahertz wave to the first area, a guide wire guiding an irradiation direction of the terahertz wave, and a vibration unit vibrating the guide wire.

In addition, the sample inspection device may be provided, an irradiation area of the terahertz wave is a second area which is generated based on the guide wire vibrating by the vibration unit, wherein the second area locates in the first area.

In addition, the sample inspection device may be provided, the controller sets a scanning path of the precision inspection module, wherein the scanning path is a set of a plurality of scanning points where an extension lines of the guide wire and the first area meet, wherein the second area is generated based on at least one scanning point among the plurality of scanning points.

In addition, the sample inspection device may be provided, the controller collects coordinates of the samples determined to suspected defective samples by the total inspection module in the first area, and the coordinates of the suspected defective samples are included in the scanning path.

In addition, the sample inspection device may be provided, the scanning point where the second area is generated corresponds to the coordinates of the suspected defective samples.

In addition, the sample inspection device may be provided, the controller collects the coordinates of samples determined to defective samples in the second area formed on the scanning path.

In addition, the sample inspection device may be provided, the scanning path is the shortest path which sets based on the coordinates of the suspected defective samples, wherein the second area is generated at the scanning point corresponding to the coordinates of the suspected defective samples on the shortest path.

In addition, the sample inspection device may be provided, the scanning path is a path capable of scanning all region of the first area, wherein the second area is generated at the scanning point corresponding to the coordinates of the suspected defective samples on the scanning path.

In addition, the sample inspection device may be provided, the precision inspection module performs the inspection on the plurality of samples, when the sample is the suspected defective sample, wherein the precision inspection module performs the inspection between the plurality of samples, when the suspected defective samples locate continuously.

In addition, the sample inspection device may be provided, when the suspected defective samples locate continuously, the second area is generated in an area corresponding to an area between the plurality of suspected defective samples.

In addition, the sample inspection device may be provided, the plurality of samples locate on a movable tray to a first direction, wherein the total inspection module and the precision inspection module locate separately on the tray to the first direction, wherein the tray moves to the first direction to locate the precision inspection module on the first area.

In addition, the sample inspection device may be provided, the precision inspection module may inspect the suspected defective samples in the first area being moved to the first direction, the total inspection module scans another area being composed of the plurality of samples adjacent to the first area simultaneously.

According to one embodiment of the present invention, a sample inspection method may be provided. The sample inspection method comprises a total inspection step scanning a first area comprising a plurality of samples; a precision inspection step performing inspection on a sample determined as a suspected defective sample by the total inspection module in the first area; and a control step processing each data obtained from the total inspection step and the precision inspection step, and determining a defective sample in the first area, and the precision inspection step may comprise an emission step of terahertz wave to the first area, an irradiation direction guidance step of terahertz wave by a guide wire, and a vibration step of the guide wire by a vibration unit.

In addition, a sample inspection method may be provided, the vibration step of the guide wire further may include generation step of a second area being located in the first area based on the vibration by the guide wire, wherein the control step further may include setting step of a scanning path of the total inspection module based on coordinates of the suspected defective samples, wherein the scanning path may be a set of a plurality of scanning points where an extension line of the guide wire and the first area meet, wherein the second area may be generated based on at least one scanning point among the plurality of scanning points.

According to one embodiment of the present invention, A storage medium storing a sample inspection program for determine whether the plurality of samples are defective according to the sample inspection method may be provided.

Hereinafter, the sample inspection device and the sample inspection method according to one embodiment of the present invention will be described.

FIG. 1 is a view illustrating a sample inspection system 1 and a sample inspection device according to one embodiment.

The sample inspection system 1 may include a sample inspection device 10, a tray 400, and a moving unit 500.

The sample inspection system 1 may inspect samples disposed on the tray 400, and the tray 400 may be moved by the moving unit 500. The sample inspection device 1 may inspect the samples disposed on the tray 400. The sample inspection device 1 may inspect the plurality of samples disposed on the tray 400. The sample inspection device 1 may inspect the plurality of samples disposed on the tray 400 moved by the moving unit 500.

The sample inspection device 1 may include a controller 100, a total inspection module 200, and a precision inspection module 300.

The controller 100 may control both of the total inspection module 200 and the precision inspection module 300. The total inspection module 200 and the precision inspection module 300 may be positioned to be spaced apart from each other. The total inspection module 200 and the precision inspection module 300 may be positioned to be adjacent to each other. The total inspection module 200 and the precision inspection module 300 may be positioned above the tray 400 to be spaced apart from each other. The total inspection module 200 and the precision inspection module 300 may be positioned in a first direction D1. The tray 400 may be positioned on the moving unit 500. The tray 400 may be detachably positioned on the moving unit 500. The tray 400 may be positioned to correspond to the total inspection module 200 and the precision inspection module 300. The tray 400 may be provided as a plurality of trays 400, and the plurality of trays 400 may be positioned to correspond to the total inspection module 200 and the precision inspection module 300. The tray 400 may have a size corresponding to an inspection area of the total inspection module 200, and in this case, after the inspection is completely performed on the tray 400 at the position corresponding to the total inspection module 200, an inspection area on the tray 400 may be moved to the position corresponding to the precision inspection module 200 in the first direction D1 by the moving unit 500.

The controller 100 may control the moving unit 500. In addition, the moving unit 500 may be controlled by a separate controller.

In the case in which the controller 100 controls the moving unit 500, the controller 100 may control the tray 400 to be positioned at an area corresponding to the sample inspection device 10 using the moving unit 500 and control the sample inspection device 10 to detect whether a sample positioned at the tray 400 is defective or not. When the tray 400 is positioned at the area corresponding to the sample inspection device 10, the controller 100 may control the total inspection module 200 to inspect all samples positioned on the tray 400 and control the precision inspection module 300 to more precisely inspect suspected defective samples, which are detected by the total inspection module 200, among the samples positioned on the tray 400. The total inspection module 200 and the precision inspection module 300 may be positioned in the same housing. Each of the total inspection module 200 and the precision inspection module 300 may be positioned in a housing thereof.

Hereinafter, each component will be described.

Figure 2:
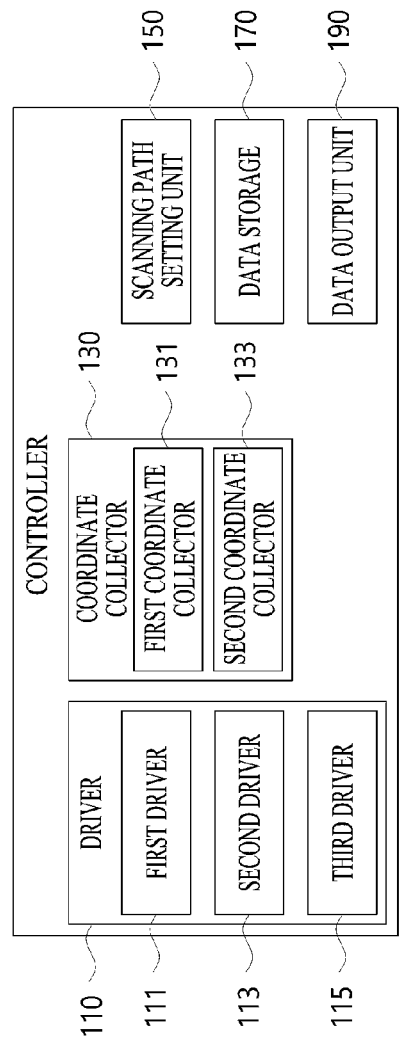
FIG. 2 is a block diagram illustrating a controller configured to control the sample inspection device according to one embodiment.

FIG. 2 is a block diagram illustrating the controller 100 configured to control the sample inspection device according to one embodiment. Referring to FIG. 2, the controller 100 may include a driver 110, a coordinate collector 130, a scanning path setting unit 150, a data storage 170, and a data output unit 190.

The controller 100 will be described with reference to FIGS. 1 and 2.

The driver 110 may drive the sample inspection system 1. The driver 110 may drive at least one of the total inspection module 200, the precision inspection module 300, and the moving unit 500. The driver 110 may include a first driver 111, a second driver 113, and a third driver 115. The first driver 111 may control the total inspection module 200. The second driver 113 may control the precision inspection module 300. The third driver 115 may control the moving unit 500.

The coordinate collector 130 may collect coordinates of samples from data about an area in which inspection is performed by the sample inspection device 10. The coordinate collector 130 may collect the coordinates of the samples from the data about the inspection performed by any one of the total inspection module 200 and the precision inspection module 300. The coordinate collector 130 may include a first coordinate collector 131 and a second coordinate collector 141. The first coordinate collector 131 may collect coordinates of samples determined as suspected defective samples in a scanning area of the total inspection module 200. The second coordinate collector 141 may collect coordinates of samples determined as defective samples in a scanning path of the precision inspection module 300.

The scanning path setting unit 150 may set the scanning path of the precision inspection module 300. The scanning path setting unit 150 may set the scanning path, which includes the coordinates of the suspected defective samples collected by the first coordinate collector 131, of the precision inspection module.

The data storage 170 may store data about the coordinates collected by the coordinate collector 130. The data storage 170 may store two-dimensional images of an area scanned by the total inspection module 200 and the precision inspection module 300.

The data output unit 190 may output the coordinates collected by the coordinate collector 130. The data output unit 190 may compare the coordinates collected by the first coordinate collector 131 and the coordinates collected by the second coordinate collector 141 to output data about the coordinates of the defective samples.

Figure 3:
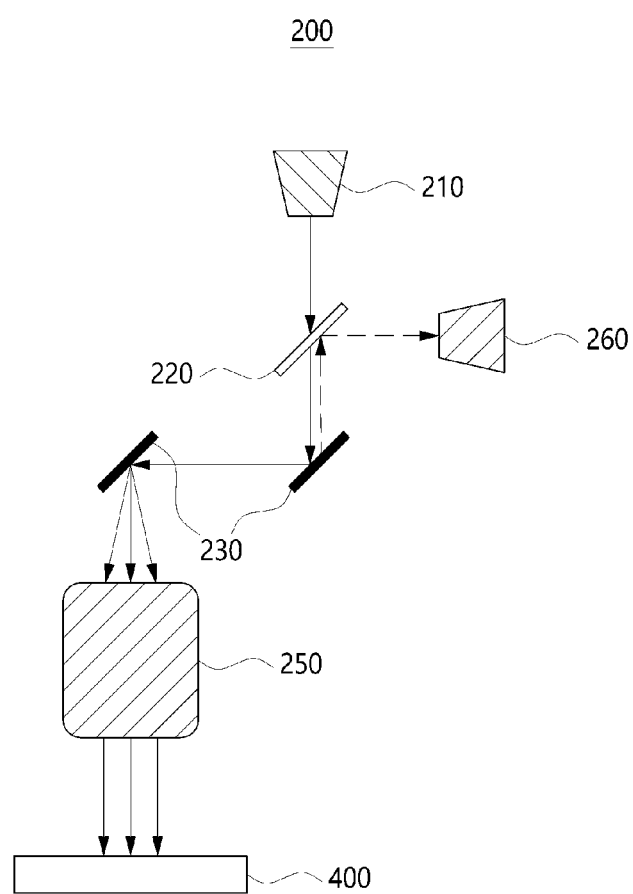
FIG. 3 is a view illustrating a total inspection module of the sample inspection device according to one embodiment.

FIG. 3 is a view illustrating the total inspection module of the sample inspection device according to one embodiment. The total inspection module will be described with reference to FIGS. 1 to 3.

The total inspection module 200 may include a first emitter 210, a first beam splitter 220, galvano-mirrors 230, a focusing lens 250, and a first detector 260.

The first emitter 210 may face the tray 400. The first emitter 210 may be positioned above the tray 400. The first emitter 210 may be positioned to be perpendicularly spaced apart from the tray 400. The first emitter 210 may be spaced apart from the galvano-mirrors 230 above the tray 400. The first beam splitter 220 may be positioned between the first emitter 210 and the galvano-mirrors 230. The galvano-mirror 230 and the focusing lens 250 may be positioned to be spaced apart from each other. The focusing lens 250 may be positioned to be spaced apart from the tray 400.

Light emitted from the first emitter 210 may be emitted to the first beam splitter 220. Some of the light emitted from the first emitter 210 may pass through the first beam splitter 220. The light emitted from the first emitter 210 and passing through the first beam splitter 220 may be emitted to the galvano-mirrors 230. A light irradiation area of the first emitter 210 may be adjusted by the galvano-mirrors 230. The light emitted from the galvano-mirror 230 may be incident on the focusing lens 250. The focusing lens 250 may adjust a focus of the incident light from the galvano-mirror 230. The light incident from the focusing lens 250 may be reflected by the tray 400. The light incident from the focusing lens 250 may be reflected by surfaces of a plurality of samples disposed on the tray 400. The light reflected by the tray 400 may be incident on the focusing lens 250 and the galvano-mirror 230 and emitted to the first beam splitter 220. At least some of the light reflected by the tray 400 may be reflected by the first beam splitter 220. The light reflected by the first beam splitter 220 may be received by the first detector 260.

The first emitter 210 may emit a terahertz wave. A wavelength of the terahertz wave emitted by the first emitter 210 may be in the range of 3 mm to 30 μm. The terahertz wave may be a continuous or pulse wave.

The galvano-mirror 230 may be provided as one or more galvano-mirrors 230. The galvano-mirror 230 may include one or more rotating drivers. The galvano-mirror 230 may be rotated by the rotating driver. The galvano-mirror 230 may be rotated by the rotating driver so that an angle of the galvano-mirror 230 may be adjusted. The angle of the galvano-mirror 230 may be adjusted by the rotating driver to adjust a path of the light emitted from the first emitter 210. The angle of the galvano-mirror 230 may be adjusted by the rotating driver to adjust a light irradiation area of the first emitter 210.

The focusing lens 250 may be a telecentric f-theta lens. The focusing lens 250 may be two or more spherical lenses or one aspherical lens.

Pieces of data received from the first detector 260 of the total inspection module 200 may be stored in the data storage 170. The pieces of the data received from the first detector 260 may be processed by the first coordinate collector 131. The first coordinate collector 131 may collect coordinates of samples, which are determined as suspected defective samples by the total inspection module 200, from the pieces of the data received from the first detector 260. The first coordinate collector 131 may collect (x,y) coordinates of the suspected defective samples based on a two-dimensional plane on the tray 400 from the pieces of data received from the first detector 260.

The total inspection module 200 may be controlled by the first driver 111. The first driver 111 may control whether the total inspection module 200 performs scanning. The first driver 111 may control whether the first emitter 210 emits the terahertz wave. The first driver 111 may control a scanning area of the total inspection module 200. The first driver 111 may control scanning to be performed on an area including the plurality of samples on the tray 400. The first driver 111 may control the rotating driver of the galvano-mirror 230. The first driver 111 may control the rotating driver of the galvano-mirror 230 to control the angle of the galvano-mirror 230. As the first driver 111 controls the rotating driver, the light irradiation area of the total inspection module 200 may be changed. The first driver 111 may control the rotating driver so that the total inspection module 200 may scan the area including the plurality of samples at high speed. The first driver 111 may control scanning to be performed on an area, which is not determined by the total inspection module 200, on the tray 400. The first driver 111 may stop the operation of the total inspection module 200 for an area already scanned by the total inspection module 200. The first driver 111 may control scanning to be performed on only the area, which is not scanned by the total inspection module 200, on the tray 400.

The total inspection module 200 may perform detection on the plurality of samples disposed on the tray 400 at high speed. The total inspection module 200 may simultaneously perform inspection on the plurality of samples disposed on the tray 400. The total inspection module 200 may have lower resolution than the precision inspection module 300 but has an advantage of scanning a wider area than the precision inspection module 300 at high speed.

The contents of the total inspection module 200 are not limited to the above-described contents, and any module capable of scanning an area including a plurality of samples may be replaced with the total inspection module 200.

Figure 4:
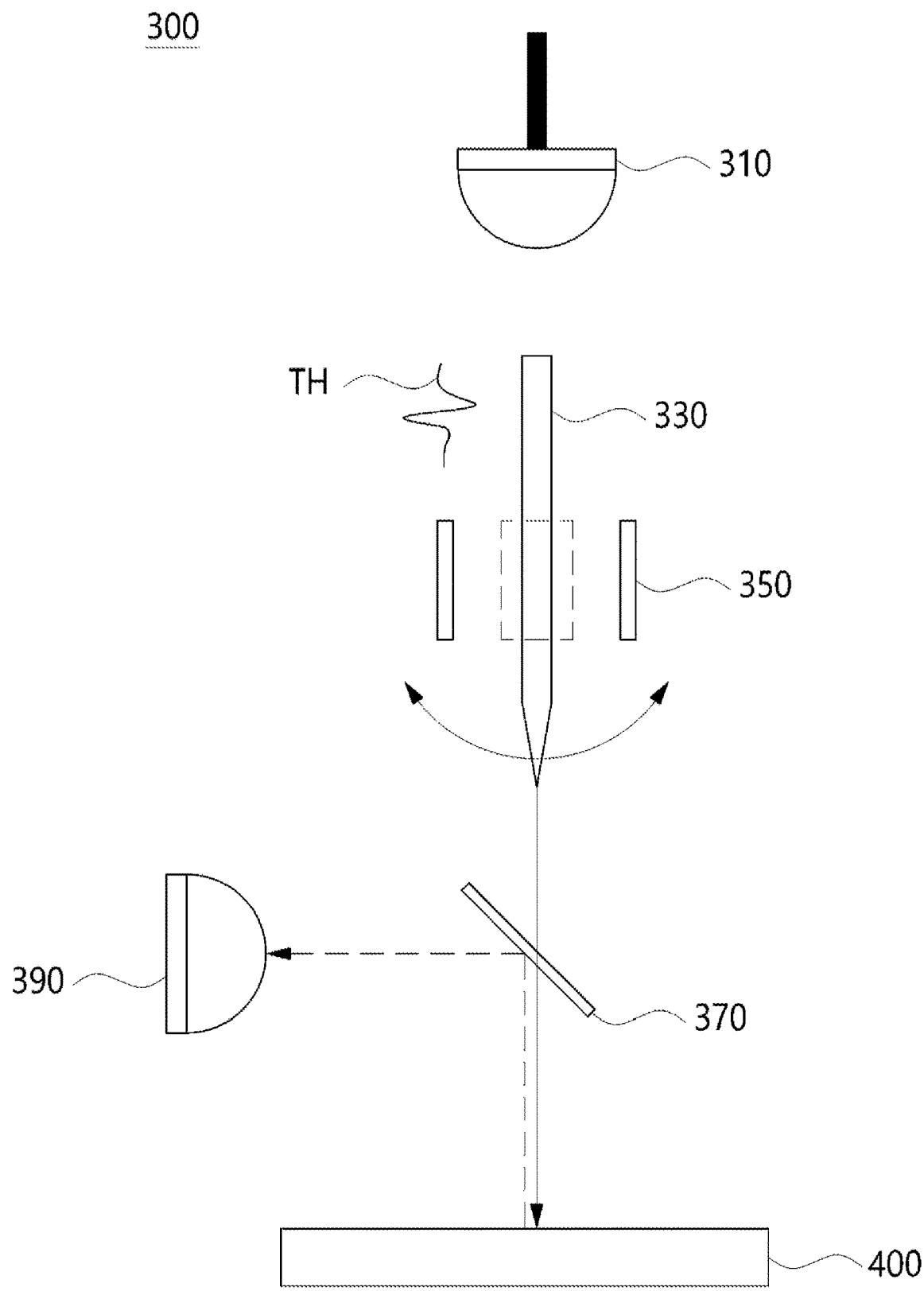
FIG. 4 is a view illustrating a precision inspection module of the sample inspection device according to one embodiment.

FIG. 4 is a view illustrating the precision inspection module 300 of the sample inspection device according to one embodiment. The precision inspection module 300 will be described with reference to FIGS. 1, 2, and 4.

The precision inspection module 300 may include a second emitter 310, a guide wire 330, vibration units 350, a second beam splitter 370, and a second detector 390.

The second emitter 310 may be positioned to be spaced upward from the tray 400. The second emitter 310 may be positioned to be perpendicularly spaced upward from the tray 400. The second emitter 310 may be positioned to be spaced apart from one end of the guide wire 330. The second emitter 310 may be positioned to be adjacent to one end of the guide wire 330. The other end of the guide wire 330 may be positioned to be spaced upward from the tray. The second emitter 310 and the guide wire 330 may be positioned to be spaced upward from the tray 400 in the gravity direction. The vibration units 350 may be positioned to be spaced apart from the guide wire 330. The plurality of the vibration units 350 may be positioned to be spaced from a surface of the guide wire 330 at predetermined intervals. The plurality of the vibration units 350 may be spaced apart from each other to be positioned at the same heights with respect to the guide wire 330. The second beam splitter 370 may be positioned between and spaced apart from the other end of the guide wire 330 and the tray 400. The second detector 390 may be positioned at a position on which light reflected by the tray 400 is incident through the second beam splitter 370.

Light emitted by the second emitter 310 may be emitted toward one end of the guide wire 330. The light emitted by the second emitter 310 may be guided along the surface of the guide wire 330 in a longitudinal direction of the guide wire 330. The light emitted by the second emitter 310 may be emitted from the other end of the guide wire 330 toward the tray 400. The guide wire 330 may be vibrated by the vibration units 350. An area of the light emitted to the tray 400 may be set by the vibration of the guide wire 330. The area of the light emitted to the tray 400 may be changed according to the vibration of the guide wire 330. The light emitted from the guide wire 330 may be reflected by the tray 400. The light emitted from the other end of the guide wire 330 may be reflected by the tray 400 and received by the second detector 390. The light reflected by the tray 400 may be emitted to the second beam splitter 370, and at least some of the light reflected by the tray 400 may be reflected by the second beam splitter 370 and received by the second detector 390.

The second emitter 310 may generate and emit a terahertz wave. A wavelength of the terahertz wave may be in the range of 3 mm to 30 µm. A frequency of the terahertz wave may be in the range of 0.1 THz to 10 THz. Since the terahertz wave corresponds to the frequency range, the terahertz wave may have a higher transmittance than visible light or infrared light. A light source of the terahertz wave may have a continuous or pulse wave. The light source of the terahertz wave may be provided as one or more light sources.

The guide wire 330 may have conductivity. The guide wire 330 may have conductivity in order to guide the light emitted by the second emitter 310. The guide wire 330 may be formed of a metal material. The metal material may be copper or silver. The guide wire 330 may be coated with a conductive metal. The guide wire 330 may be formed of a conductive polymer. The conductive polymer may include at least one material among polyaniline, polypyrrole, and polythiophene. The guide wire 330 may have a certain flexibility to be vibrated by the vibration units 350. In the case in which the guide wire 330 is formed of a conductive polymer, the guide wire 330 may provide convenience in controlling an area of the light emitted from the other end thereof. The guide wire 330 may be coupled to the light emitted by the second emitter 310 through one of various methods. The coupling method may be at least one of a direct end-fire coupling method, a surface plasmon coupling method, a wire to wire coupling method, and a quasi-optical coupling method. A light irradiation area, which is guided by the guide wire 330, of the second emitter 310 may be proportional to an area of the other end of the guide wire 330. The resolution of the precision inspection module 300 may be adjusted according to the area of the other end of the guide wire 330. A width of the other end of the guide wire 330 may be in the range of several nm to several tens µm.

The vibration unit 350 will be described with reference to FIGS. 5 to 8. FIGS. 5 to 8 are views illustrating the guide wire and the vibration unit of the precision inspection module of FIG. 4.

Figure 5:
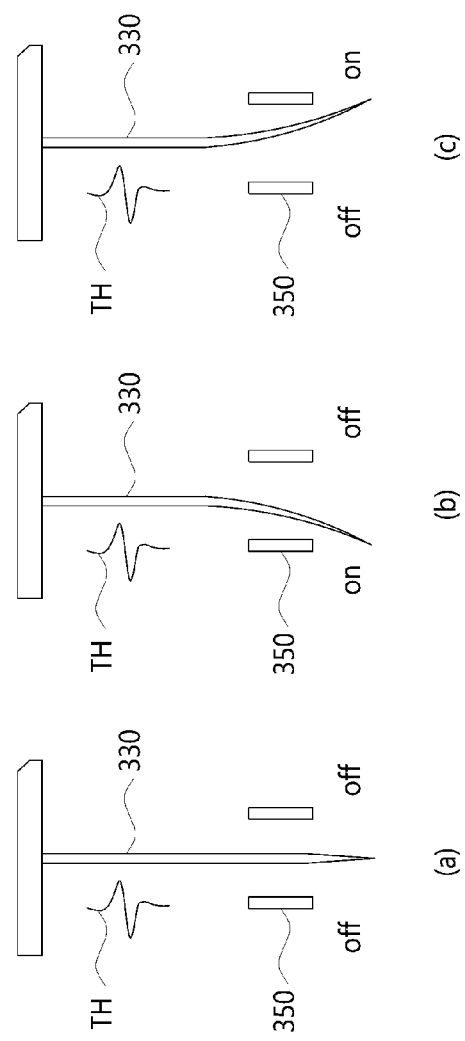
FIGS. 5 to 8 are views illustrating a guide wire and a vibration unit of the precision inspection module of FIG. 4.
Figure 6:
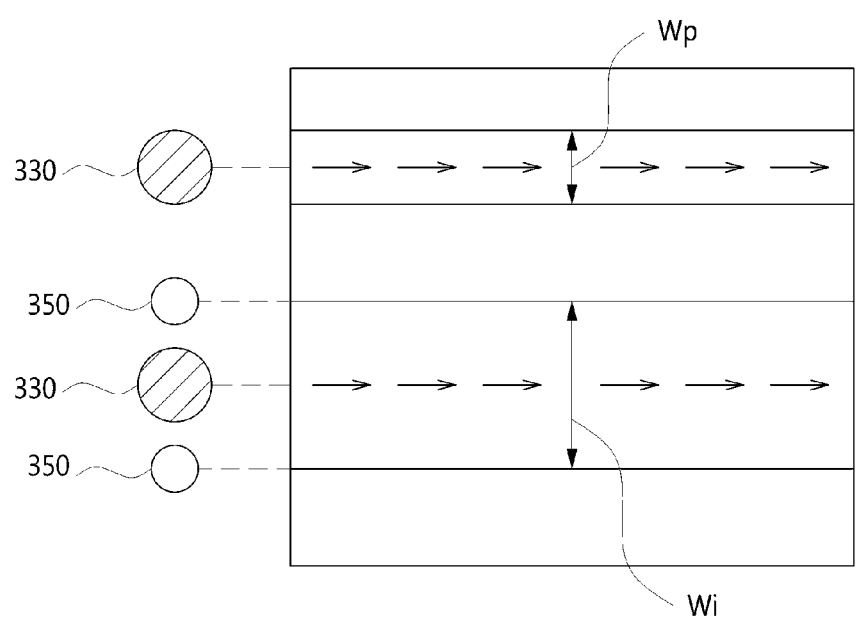

FIG. 5 is a set of views illustrating a state in which the guide wire 330 is vibrated by the vibration units 350. FIG. 6 is a view illustrating the light irradiation area which is increased when the guide wire 330 is vibrated by the vibration units 350. Referring to FIG. 5, the vibration units 350 may vibrate the guide wire 330 in a width direction of the guide wire 330. As illustrated in FIG. 5a, an initial state of the guide wire 330 may be a state in which the guide wire 330 is not bent. The initial state of the guide wire 330 may be a state in which the vibration units 350 are turned off. Then, as illustrated in FIG. 5b, the vibration unit 350 corresponding to a left side of the guide wire 330 may be turned on to bend the guide wire 330 in a left direction thereof. In addition, as illustrated in FIG. 5c, the vibration unit 350 corresponding to a right side of the guide wire 330 may be turned on to bend the guide wire 330 in a right direction thereof. Referring to FIG. 6, in the case in the guide wire 330 is not vibrated by the vibration units 350, the light irradiation area depends on the area of the other end of the guide wire 330. An area Wi of the light emitted from the other end of the guide wire 330 may be increased by the vibration units 350 when compared to an area Wp of the other end of the guide wire 330. The precision inspection module 300 may perform scanning at high speed according to the increase in the light irradiation area of the other end of the guide wire 330 when compared to the area of the other end of the guide wire 330.

Irradiation of the light along the guide wire 330 may be performed based on an apertureless near-field method, and the resolution of the precision inspection module 300 may be improved. As the guide wire 330 is vibrated by the vibration units 350, an irradiation area may be widened while uniformity is maintained in an area which is greater than a size of a beam spot of the second emitter 310. In addition, since the size of the beam spot of the precision inspection module 300 depends on an area of a tip of the guide wire 440, the size of the beam spot may be minimized and a frequency of the light emitted by the second emitter may be decreased. In a case in which the terahertz wave is emitted by the second emitter, since the frequency of the terahertz wave may be decreased due to the guide wire 440, the power of the terahertz wave may be increased. As the power of the terahertz wave is increased, the precision inspection module 300 may be increased the permeability thereof in samples disposed on the tray 400 so that the precision of the precision inspection module 300 may be improved.

Figure 7:
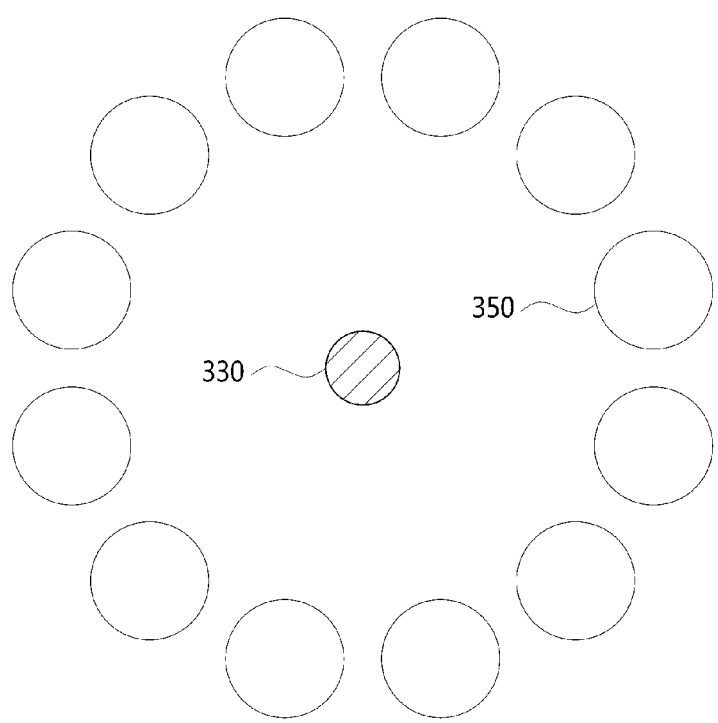

FIG. 7 is a view for describing position relationships between the guide wire 330 and the vibration units 350. The vibration unit 350 may be provided as one or more vibration units 350. In the case in which the vibration unit 350 is provided as the plurality of vibration units 350, the plurality of vibration units 350 may be positioned to be spaced apart from the guide wire 330 by predetermined distances. The plurality of vibration units 350 may be spaced apart from an outer circumferential surface of the guide wire 330 and spaced apart from each other at predetermined intervals.

Figure 8:
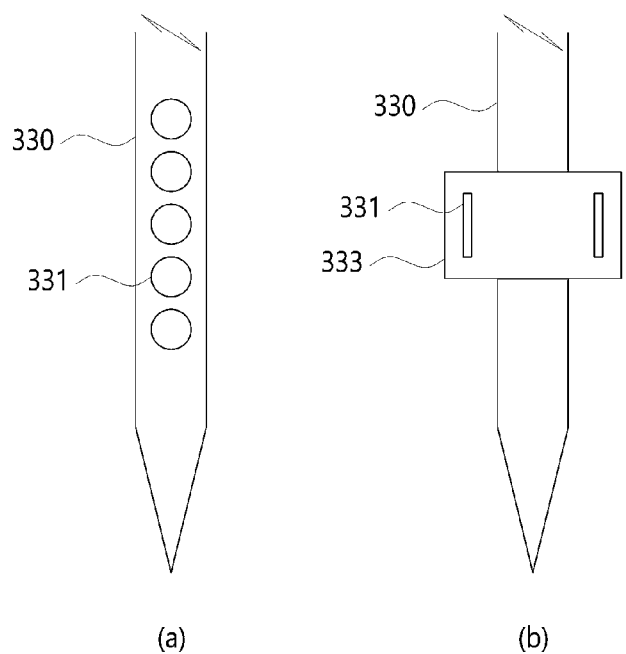

Referring to FIG. 8, the guide wire 330 may include a vibration inductors 331 corresponding to the vibration units 350. The vibration units 350 and the vibration inductors 331 may be magnets or coils. In the case in which the vibration units 350 are the magnets, the vibration inductors 331 may be the coils, and in the case in which the vibration units 350 are the coils, the vibration inductors 331 may be the magnets. As illustrated in FIG. 8a, the vibration inductors 331 may be in the guide wire 330. The vibration inductors 331 may be provided as the plurality of vibration inductors 331, and the plurality of vibration inductors 331 may be in the guide wire 330 to be spaced apart from each other in a longitudinal direction of the guide wire 330. As illustrated in FIG. 8b, the vibration inductors 331 may be positioned on an outer surface of the guide wire 330. The vibration inductors 331 may be positioned to be spaced apart from each other on the outer surface of the guide wire 330. In the case in which the vibration inductors 331 are positioned on the outer surface of the guide wire 330, the vibration inductors 331 may be fixed to the guide wire 330 by a non-conductor 333. The non-conductor 333 may have permeability that allows light emitted by the second emitter 310 to pass through the non-conductor 333. The non-conductor 333 may have high permeability so that a path of the light emitted by the first emitter 310 may not be affected. The non-conductor 333 may be Teflon.

Pieces of data received from the second detector 390 of the precision inspection module 300 may be stored in the data storage 170. The pieces of the data received from the second detector 390 may be processed by the second coordinate collector 141. The second coordinate collector 141 may collect coordinates of samples, which are determined as defective samples by the precision inspection module 300, among the pieces of the data received from the second detector 390. The second coordinate collector 141 may collect coordinates of samples determined as defective samples on the basis of coordinates of suspected defective samples collected by the first coordinate collector 131. The second coordinate collector 141 may collect (x,y) coordinates of the defective samples based on a two-dimensional plane on the tray 400 among the pieces of the data received from the second detector 390.

The precision inspection module 300 may be controlled by the second driver 113. The second driver 113 may control whether the precision inspection module 300 performs scanning. The second driver 113 may control a scanning area of the precision inspection module 300. The second driver 113 may control the precision inspection module 300 to scan a scanning area of the total inspection module 200. The second driver 113 may control the precision inspection module to scan specific areas determined as suspected defective samples in the scanning area of the total inspection module 200. The second driver 113 may control the precision inspection module 300 to scan only the specific areas determined as the suspected defective samples in the scanning area of the total inspection module 200.

The second driver 113 may control movement of the precision inspection module 300. The second driver 113 may control movement of a light irradiation area of the precision inspection module 300. The second driver 113 may move the precision inspection module 300 along x, y, and z axes. The second driver 113 may move the light irradiation area of the precision inspection module 300 along the x, y, and z axes. The second driver 113 may move the precision inspection module 300 or the light irradiation area of the precision inspection module 300 along a scanning path set by the scanning path setting unit 150. The second driver 113 may drive the vibration unit 350 configured to vibrate the guide wire 330. The second driver 113 may drive the vibration unit 350 to change the light irradiation area of the precision inspection module 300 using the vibration of the guide wire 330.

Figure 9:
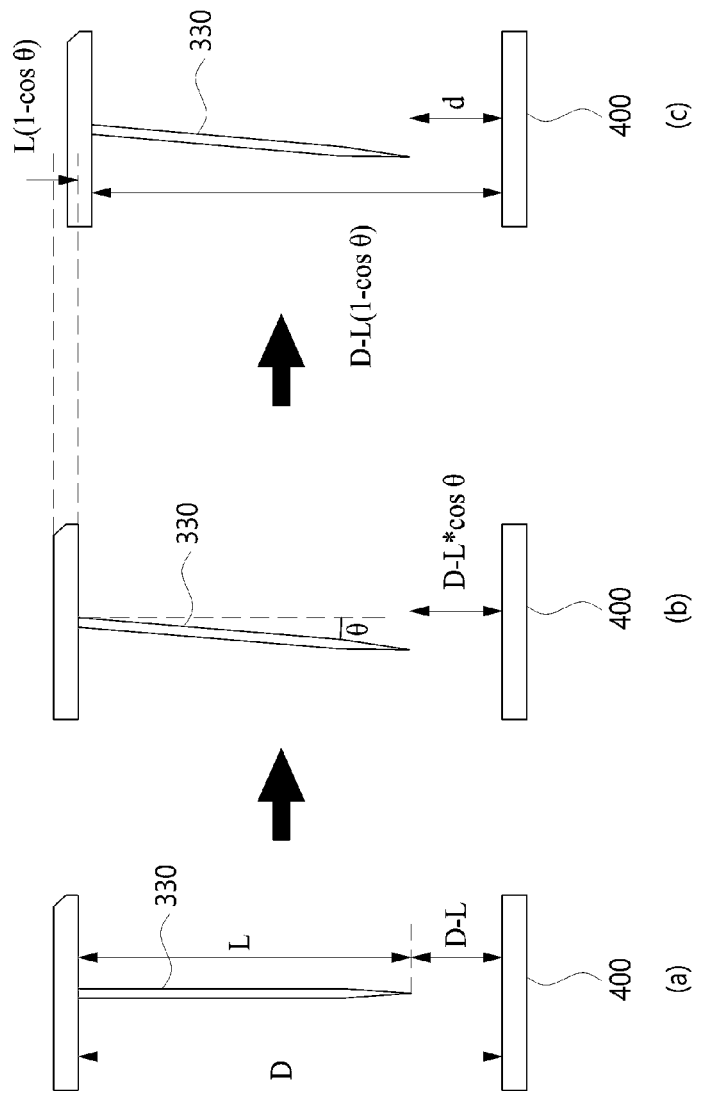
FIG. 9 is a set of views illustrating correction of a scanning area of the precision inspection module of FIG. 4.

The second driver 113 may move the precision inspection module 300 or the light irradiation area of the precision inspection module 300 along the z axis to control the light irradiation area of the precision inspection module to be constant. Referring to FIG. 9, since a distance d between the other end of the guide wire 330 and the tray 400 may be changed by the vibration unit 350, the irradiation area of the precision inspection module 300 may be changed according to the predetermined distance d. Referring to FIG. 9a, in the case in which the guide wire 330 is in the initial state, the distance between the other end of the guide wire 330 and the tray 400 may be a distance D−L in which a length L of the guide wire 330 is subtracted from the distance D between the precision inspection module and the tray. In a case in which the guide wire 330 vibrates, the distance between the other end of the guide wire 330 and the tray 400 may be changed to a distance D−L*cos θ. Accordingly, as illustrated in FIG. 9c, the precision inspection module 300 may be moved by a distance L(1−cos θ) along the z axis to maintain the distance between the other end of the guide wire 330 and the tray 400 to be constant as the predetermined distance d.

Figure 10:
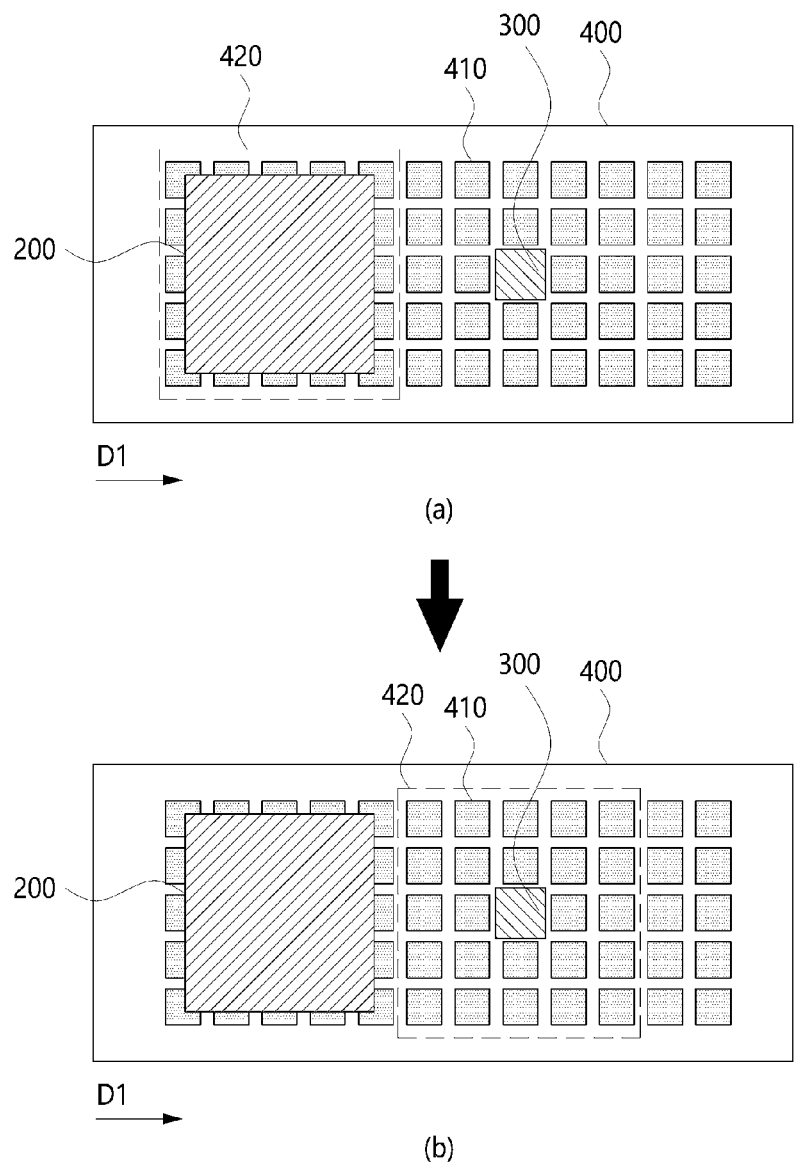
FIG. 10 is a set of top views illustrating the sample inspection device according to one embodiment and illustrating movement of an inspection area according to movement of a tray.

FIG. 10 is a set of top views illustrating the sample inspection device according to one embodiment and illustrating movement of an inspection area according to movement of a tray. Referring to FIG. 10, a plurality of samples 410 may be disposed on the tray 400. The plurality of samples 410 may be disposed on the tray 400 at predetermined intervals. The plurality of samples 410 of the tray 400 may be divided into areas having predetermined areas. The total inspection module 200 perform inspection on the areas including the plurality of samples 410, and the area on which the inspection is performed by the total inspection module 200 may be an inspection area 420. The inspection area 420 may correspond to a size of the tray 400. In a case in which the tray 400 is greater than the inspection area 420, a plurality of inspection areas 420 may be present on the same tray as the tray 400.

In a case in which the inspection area 420 is present as the plurality of inspection areas 420, the inspection areas 420 may be present to be spaced apart from each other at predetermined intervals. The inspection areas 420 may be positioned on the same tray or also be positioned on different trays. After inspection is performed on the inspection area 420 by the total inspection module 200, inspection may be performed thereon by the precision inspection module 300.

The tray 400 may be moved by the moving unit 500, and the moving unit 500 may be controlled by the third driver 115. The third driver 115 may control the tray 400 positioned on the moving unit 500 to move in the first direction D1. The third driver 115 may control the tray 400 to move in the first direction D1 at a predetermined speed. As illustrated in FIG. 10a, the area 420 including the plurality of samples 410 may be positioned in an area corresponding to the total inspection module 200. As illustrated in FIG. 10b, the third driver 115 may control a one area 420 including the plurality of samples 410 completely scanned by the total inspection module 200 to be positioned under the precision inspection module 300. After the total inspection module 200 scans one area 420 including the plurality of samples 410, the third driver 115 may control another area in which a plurality of samples 410 are disposed to be positioned under the total inspection module 200. The third driver 115 may stop until the total inspection module 200 or the precision inspection module 300 completely scans one area 420 including the plurality of samples 410. The third driver 115 may stop until the total inspection module 200 and the precision inspection module 300 completely scan one area 420 including the plurality of samples 410.

Figure 11:
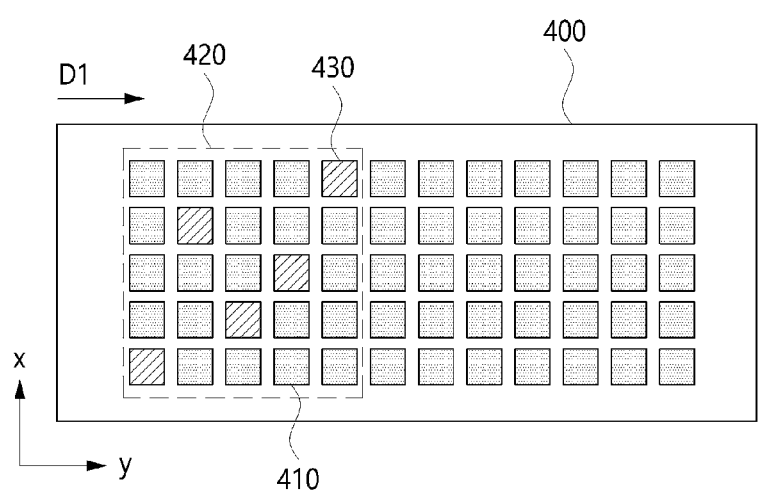
FIG. 11 is a view illustrating suspected defective samples detected in an inspection area of the precision inspection module of FIG. 1.
Figure 12:
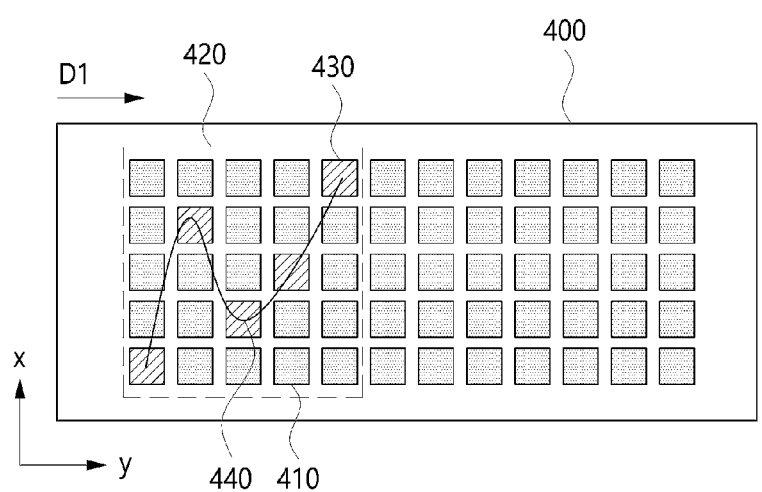
FIG. 12 is a view illustrating a shortest path of scanning paths of the precision inspection module, which are set on the basis of coordinates of the suspected defective samples of FIG. 11, which are collected by the controller of the sample inspection device of FIG. 1.

FIG. 11 is a view illustrating suspected defective samples 430 in the area 420 including the plurality of samples 410 determined by the total inspection module 200 of the sample inspection device 1 of FIG. 1. FIG. 12 is a view illustrating the shortest path of scanning paths 440 of the precision inspection module 300 on the basis of coordinates of the suspected defective samples 430 of FIG. 11, which are collected by the controller of the sample inspection device of FIG. 1.

Referring to FIGS. 2 and 11, the coordinates of the suspected defective samples 430 may be obtained when the total inspection module 200 scans one area 420 including the plurality of samples 410. The coordinates of the suspected defective samples 430 may be collected by the first coordinate collector 131.

Referring to FIGS. 2 and 12, the scanning path setting unit 150 may set the scanning path 440 of the precision inspection module 300 on the basis of the coordinates of the suspected defective samples 430 collected by the first coordinate collector 131. The scanning path 440 may be a set of a plurality of scanning points at which extension lines of the guide wire 330 meet one area 420 including the plurality of samples 410. The scanning path 440 may include the coordinates of the suspected defective samples 430. The scanning path 440 may be a path including all of the coordinates of the suspected defective samples 430. The scanning path 440 may be the shortest path set on the basis of any one coordinate among the coordinates of the suspected defective samples 430. As illustrated in FIG. 12, the scanning path 440 may be the shortest path set on the basis of the suspected defective sample 430 close to a border of one area 420 including the plurality of samples 410. Accordingly, since the precision inspection module 300 may selectively inspect only the suspected defective sample 430 along the scanning path 440, an inspection time of the precision inspection module 300 may be decreased.

Figure 13:
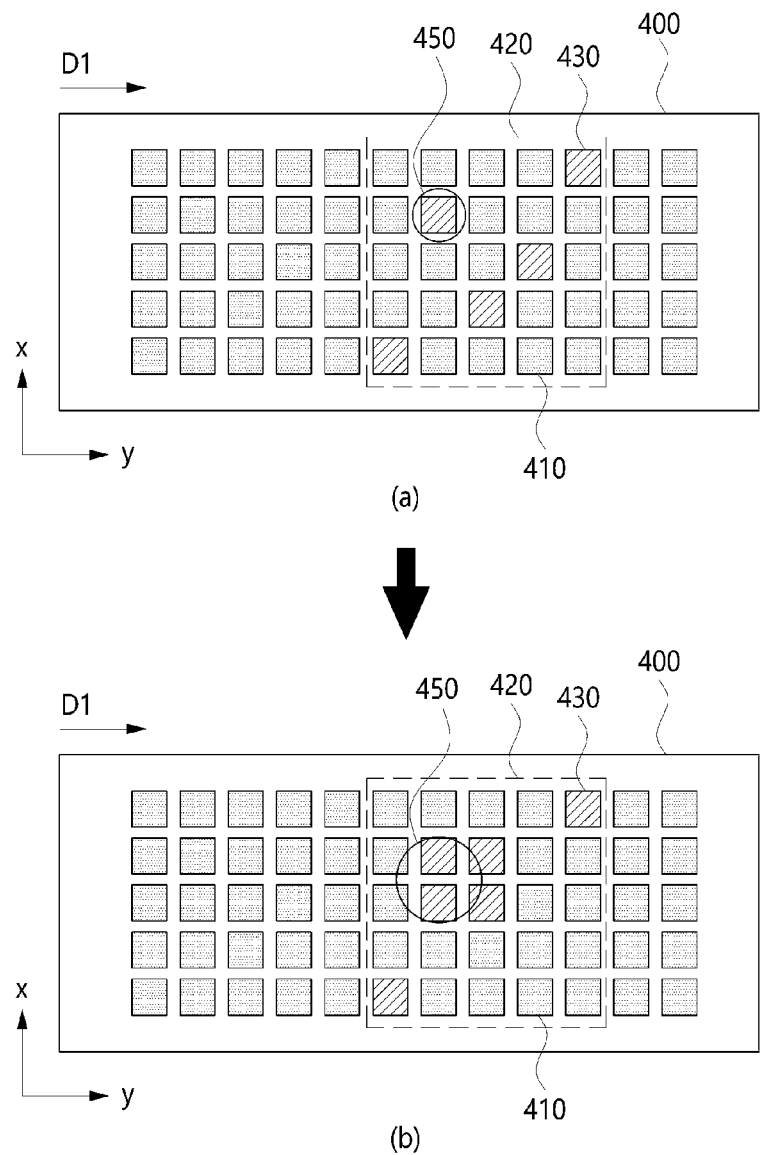
FIG. 13 is a set of views illustrating an irradiation area, which is formed on the suspected defective samples included in the scanning path of the precision inspection module of FIG. 12, of the precision inspection module.

FIG. 13 is a set of views illustrating an irradiation area 450, which is formed on the suspected defective samples 430 included in the scanning path 440 of the precision inspection module of FIG. 12, of the precision inspection module.

Referring to FIGS. 2, 12, and 13, the irradiation area 450 of the precision inspection module 300 may be formed on the basis of at least any one scanning point of the plurality of scanning points on the scanning path 440. The irradiation area 450 may correspond to the coordinates of the suspected defective samples 430 on the scanning path 440. As illustrated in FIG. 13a, the irradiation area 450 may include the coordinates of the suspected defective samples 430. Alternatively, the scanning points forming the irradiation area 450 may match with the coordinates of the suspected defective samples 430. As illustrated in FIG. 13b, the irradiation area 450 may include at least two or more of the coordinates of the suspected defective samples 430. The scanning points forming the irradiation area 450 may be formed between the coordinates of the suspected defective samples 430. A case in which the scanning points forming the irradiation area 450 are formed between the suspected defective samples 430 may be a case in which the suspected defective samples 430 are consecutively positioned. In the case in which the suspected defective samples 430 are consecutively positioned, the scanning points forming the irradiation area 450 may be formed between the suspected defective samples 430. The second driver 113 may stop movement of the scanning points of the precision inspection module 200 while the irradiation area 450 is formed on the scanning path 440.

The sample inspection device according to one embodiment of the present invention will be described below. Referring to FIGS. 2 to 13, the following contents have a difference only in the scanning path 440 set by the scanning path setting unit 150, and the other components and contents are the same as described above.

Figure 14:
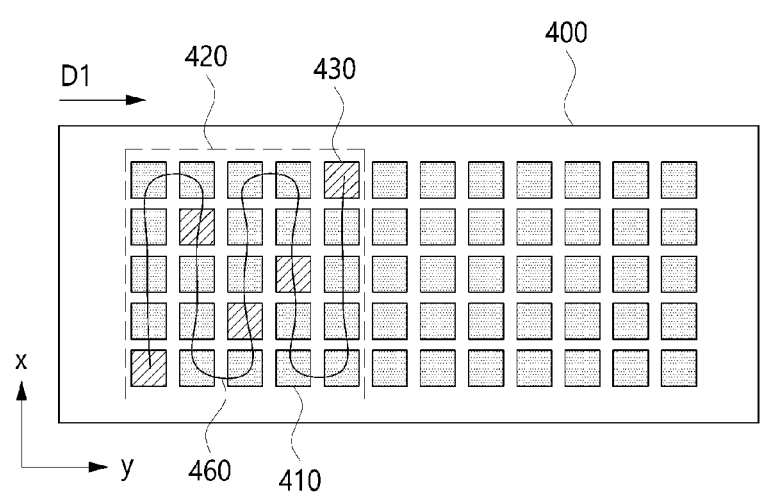
FIG. 14 is a view illustrating a predetermined scanning path of the precision inspection module to pass through all samples included in an inspection area of the total inspection module of FIG. 1.

FIG. 14 is a view illustrating a scanning path 460 of the precision inspection module, wherein the scanning path 460 is predetermined to pass through all of the samples included in the inspection area 420 on which inspection is performed by the total inspection module 200 of the sample inspection device 1 of FIG. 1. Referring to FIGS. 2 and 14, the scanning path 460 may include all of the coordinates of the samples included in the inspection area 420. The scanning path 460 may include the coordinates of the suspected defective samples 430. The scanning path 460 may be a path set on the basis of one coordinate of the plurality of samples 410. As illustrated in FIG. 14, the scanning path 460 may be the path set on the basis of the sample close to an edge portion of the border of the inspection area 420. The second driver 113 may stop movement of the scanning point of the precision inspection module 200 while the irradiation area 450 is formed at a position corresponding to the coordinates of the suspected defective samples 430 on the scanning path 460. According to the scanning path 460, the scanning path setting unit 150 may not set a scanning path for each inspection area 420. Since the scanning path setting unit 150 does not set the scanning path of each of the inspection areas 420, a calculation amount of the scanning path setting unit 150 may be reduced. In addition, since the scanning path 460 may be fixed, an amount of movement of the precision inspection module 300 may be restricted. As the amount of movement of the precision inspection module 300 is restricted, sudden movement of the precision inspection module 300 may be prevented to improve durability. The scanning point of the precision inspection module 300 may be moved along the predetermined scanning path 460 to perform inspection at positions corresponding to the coordinates of the suspected defective samples 430 requiring inspection to be performed by the precision inspection module 300.

Figure 15:
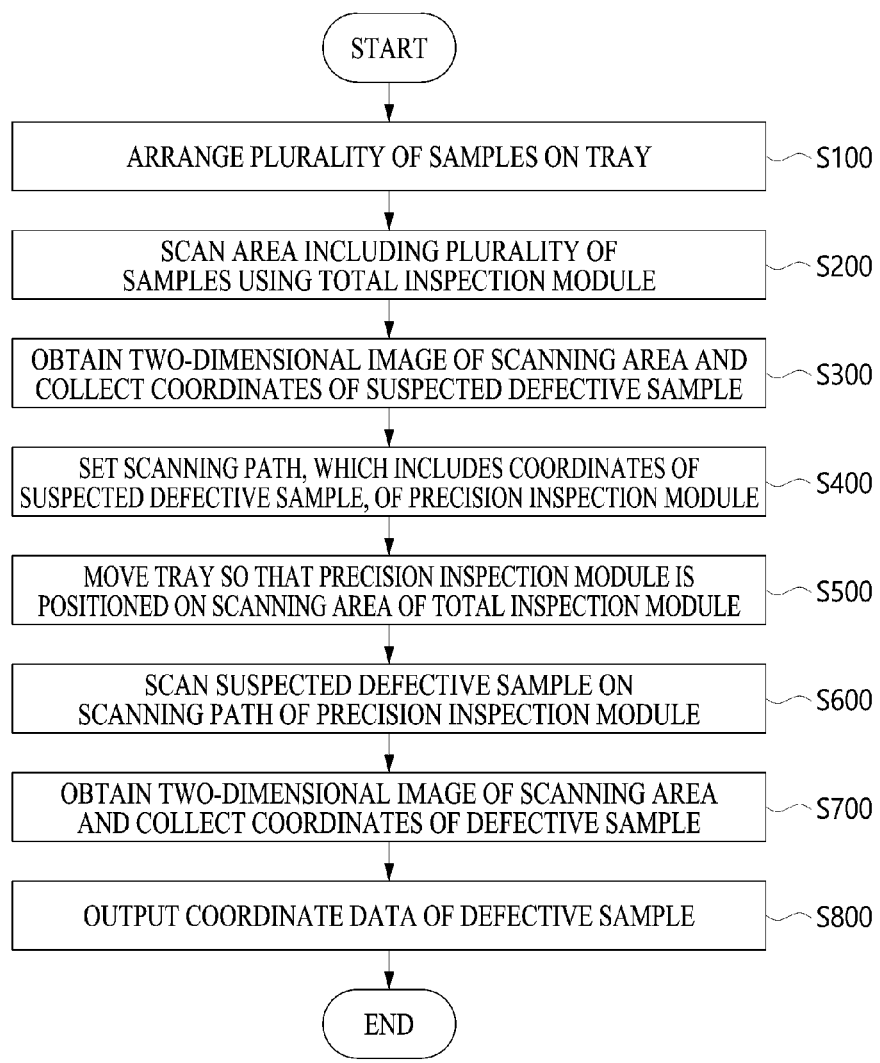
FIG. 15 is a view illustrating a sample inspection method according to one embodiment.

A sample inspection method according to one embodiment of the present invention will be described. FIG. 15 is a view illustrating a sample inspection method according to one embodiment. Referring to FIGS. 1 to 15, the sample inspection method according to one embodiment includes a step in which a plurality of samples are disposed on the tray (S100), a step in which the total inspection module scans an area including a plurality of samples (S200), a step in which a two-dimensional image of a scanning area is obtained and coordinates of suspected defective samples are collected (S300), a step in which the precision inspection module sets a scanning path including the coordinates of the suspected defective samples (S400), a step in which the tray is moved so that the precision inspection module is positioned on the scanning area of the total inspection module (S500), a step in which the suspected defective samples on the scanning path of the precision inspection module are scanned (S600), a step in which a two-dimensional image of a defective sample determined by the precision inspection module is obtained and coordinate data thereof is collected (S700), and a step in which the coordinate data of the defective sample is output (S800).

In the step in which the plurality of samples are disposed on the tray (S100), the moving unit 500 may be driven by control of the controller 100, and thus the tray 400 may be moved so that a plurality of samples on the tray 400 may be disposed in an area corresponding to the total inspection module 200.

In the step in which the total inspection module scans the area including the plurality of samples (S200), the total inspection module 200 may be driven by control of the driver 110, and thus the plurality of samples positioned at a position corresponding to the total inspection module may be scanned.

In the step in which the two-dimensional image of the scanning area is obtained and the coordinates of the suspected defective samples are collected (S300), data of the two-dimensional image of the inspection area 420 on which inspection is performed by the total inspection module 200 may be obtained, and the coordinates of the suspected defective samples 430 may be collected by the coordinate collector 130 on the basis of the data.

In the step in which the precision inspection module sets the scanning path including the coordinates of the suspected defective samples (S400), the scanning path setting unit 150 may control to set the scanning path 440 of the precision inspection module 300 for the inspection area 420 of the total inspection module 200.

In the step in which the tray is moved so that the precision inspection module is positioned on the scanning area of the total inspection module (S500), the moving unit 500 may be driven by control of the controller 100 so that the inspection area 420 on the tray 400 may be moved to a position corresponding to the precision inspection module.

In the step in which the suspected defective samples on the scanning path of the precision inspection module are scanned (S600), the precision inspection module 300 may be driven by control of the driver 110, and thus the precision inspection module 300 may be moved to the scanning path 440 set by the scanning path setting unit 150 to perform inspection on the suspected defective samples disposed on the scanning path 440.

In the step in which a two-dimensional image of defective samples determined by the precision inspection module is obtained and coordinate data thereof is collected (S700), data about the two-dimensional image of the light irradiation area 450 on which inspection is performed by the precision inspection module 300, and the coordinates of the samples determined as defective samples among the suspected defective samples may be collected by the coordinate collector 130 on the basis of the data.

In the step in which the coordinate data of the defective samples is output (S800), the data about the defective samples may be output by the data output unit 190, and the data may be the coordinates of the defective samples collected by the coordinate collector 130.

Referring to FIG. 15, an order of the sample inspection method is not limited to the sample inspection method described in FIG. 15.

A sample inspection program according to one embodiment of the present invention may be a sample inspection program stored in a medium in order to determine whether the plurality of samples are defective or not according to the sample inspection method.

The invention claimed is:

1. A sample inspection device comprising:
a total inspection module scanning a first area comprising a plurality of samples;
a precision inspection module performing inspection on a sample determined as a suspected defective sample by the total inspection module in the first area; and
a controller processing each data obtained from the total inspection module and the precision inspection module, and detecting a defective sample in the first area,
wherein the precision inspection module comprises,
an emitter emitting terahertz wave to the first area,
a guide wire guiding an irradiation direction of the terahertz wave, and
a vibration unit vibrating the guide wire,
wherein an irradiation area of the terahertz wave is a second area which is generated by being guided by the guide wire,
wherein the second area located in the first area, and
wherein one end of the guide wire is guided toward a first direction by attractive force generated between the guide wire and the vibration unit such that the second area extends in the first direction.

2. The sample inspection device of claim 1,
wherein the vibrating unit is positioned to be spaced apart from the guide wire in the first direction, and
wherein an area by which the second area extends toward the first direction corresponds to a distance between the guide wire and the vibration unit.

3. The sample inspection device of claim 2,
wherein the controller sets a scanning path of the precision inspection module,
wherein the scanning path is a set of a plurality of scanning points where an extension line of the guide wire and the first area meet,
wherein the second area is generated based on at least one scanning point among the plurality of scanning points.

4. The sample inspection device of claim 3,
wherein the controller collets coordinates of samples determined to suspected defective samples by the total inspection module in the first area,
the coordinates of the suspected defective samples are included in the scanning path.

5. The sample inspection device of claim 4,
wherein the scanning point where the second area is generated corresponds to the coordinates of the suspected defective samples.

6. The sample inspection device of claim 4,
wherein the scanning path is the shortest path which sets based on the coordinates of the suspected defective samples,
wherein the second area is generated at the scanning point corresponding to the coordinates of the suspected defective samples on the shortest path.

7. The sample inspection device of claim 4,
wherein the scanning path is a path capable of scanning all region of the first area,
wherein the second area is generated at the scanning point corresponding to the coordinates of the suspected defective samples on the scanning path.

8. The sample inspection device of claim 3,
wherein the controller collects the coordinates of the samples determined to defective samples by the second area generated in the scanning path.

9. The sample inspection device of claim 3,
wherein the precision inspection module performs the inspection on the plurality of samples, when the sample is the suspected defective sample,
wherein the precision inspection module performs the inspection between the plurality of samples, when the suspected defective samples locate continuously.

10. The sample inspection device of claim 3,
wherein when the suspected defective samples locate continuously, the second area is generated in an area corresponding to an area between the plurality of suspected defective samples.

11. The sample inspection device of claim 1,
wherein the plurality of samples locate on a movable tray to a first direction,
wherein the total inspection module and the precision inspection module locate separately on the tray to the first direction,
wherein the tray moves to the first direction to locate the precision inspection module on the first area.

12. The sample inspection device of claim 11,
wherein the precision inspection module inspects the suspected defective samples in the first area being moved to the first direction, the total inspection module scans another area being composed of the plurality of samples adjacent to the first area simultaneously.

13. A sample inspection method comprising:
a total inspection step scanning a first area comprising a plurality of samples;
a precision inspection step performing inspection on a sample determined as a suspected defective sample by the total inspection module in the first area; and
a control step processing each data obtained from the total inspection step and the precision inspection step, and determining a defective sample in the first area,
wherein the precision inspection step comprises,
an emission step of terahertz wave to the first area,
an irradiation direction guidance step of terahertz wave by a guide wire, and
a vibration step of the guide wire by a vibration unit,
wherein an irradiation area of the terahertz wave is a second area which is generated by being guided by the guide wire,
wherein the second area located in the first area, and
wherein one end of the guide wire is guided toward a first direction by attractive force generated between the guide wire and the vibration unit such that the second area extends in the first direction.

14. The sample inspection method of claim 13,
wherein the control step further includes setting step of a scanning path of the total inspection module based on coordinates of the suspected defective samples,
wherein the scanning path is a set of a plurality of scanning points where an extension line of the guide wire and the first area meet,
wherein the second area is generated based on at least one scanning point among the plurality of scanning points.

15. A storage medium storing a sample inspection program for determine whether the plurality of samples are defective according to the sample inspection method of claim 13.

* * * * *